(12) United States Patent
Choi et al.

(10) Patent No.: US 11,733,543 B2
(45) Date of Patent: Aug. 22, 2023

(54) SMART WEARABLE LENS MOUNTED WITH ALL-SOLID-STATE THIN FILM SECONDARY BATTERY AND METHOD FOR MANUFACTURING THE SAME

(71) Applicant: KOREA INSTITUTE OF SCIENCE AND TECHNOLOGY, Seoul (KR)

(72) Inventors: Ji-Won Choi, Seoul (KR); Yong-Won Song, Seoul (KR); Hyunjung Yi, Seoul (KR); Jin Sang Kim, Seoul (KR); Chong Yun Kang, Seoul (KR); Seong Keun Kim, Seoul (KR); Seung Hyub Baek, Seoul (KR); Sang Tae Kim, Seoul (KR); Hyun Seok Lee, Seoul (KR)

(73) Assignee: KOREA INSTITUTE OF SCIENCE AND TECHNOLOGY, Seoul (KR)

( * ) Notice: Subject to any disclaimer, the term of this patent is extended or adjusted under 35 U.S.C. 154(b) by 1293 days.

(21) Appl. No.: 16/044,510

(22) Filed: Jul. 25, 2018

(65) Prior Publication Data
US 2019/0033618 A1  Jan. 31, 2019

(30) Foreign Application Priority Data
Jul. 27, 2017  (KR) .................. 10-2017-0095660

(51) Int. Cl.
| | |
|---|---|
| G02C 7/04 | (2006.01) |
| H01M 4/64 | (2006.01) |
| H01M 10/0562 | (2010.01) |
| H01M 4/04 | (2006.01) |
| H01M 10/058 | (2010.01) |
| H01M 10/04 | (2006.01) |
| G02C 11/00 | (2006.01) |

(Continued)

(52) U.S. Cl.
CPC ............... *G02C 7/04* (2013.01); *G02C 11/10* (2013.01); *H01M 4/0426* (2013.01); *H01M 4/64* (2013.01);
(Continued)

(58) Field of Classification Search
CPC ....... G02C 7/04; G02C 11/10; H01M 4/0426; H01M 4/64; H01M 10/0436;
(Continued)

(56) References Cited

U.S. PATENT DOCUMENTS

| 8,608,310 B2 | 12/2013 | Otis et al. |
| 10,361,405 B2 * | 7/2019 | Muthu .................... H01M 6/06 |

(Continued)

FOREIGN PATENT DOCUMENTS

| KR | 101535075 B1 | 7/2015 |
| KR | 1020160010870 A | 1/2016 |

(Continued)

OTHER PUBLICATIONS

Daeil Kim et al., "Body-Attachable and Stretchable Multisensors Integrated with Wirelessly Rechargeable Energy Storage Devices," Advanced Materials, 2016, pp. 748-756, vol. 28.

(Continued)

*Primary Examiner* — Richard Tan
(74) *Attorney, Agent, or Firm* — Cantor Colburn LLP

(57) ABSTRACT

Disclosed herein is a smart wearable lens mounted with an all-solid-state thin film secondary battery including a flexible substrate, a cathode current collector, a cathode, a solid electrolyte, an anode, and an anode current collector. The smart wearable lens mounted with the all-solid-state thin film secondary battery may be stably and continuously supplied with power and has a low self-discharge rate. In addition, the smart wearable lens may minimize aversion when humans are wearing the smart wearable lens and be suitably used for a curved lens, especially a micro-lens such as a contact lens.

15 Claims, 9 Drawing Sheets

(51) Int. Cl.
*H02J 50/10* (2016.01)
*H01M 6/40* (2006.01)

(52) U.S. Cl.
CPC ..... *H01M 10/0436* (2013.01); *H01M 10/058* (2013.01); *H01M 10/0562* (2013.01); *H01M 6/40* (2013.01); *H01M 2220/30* (2013.01); *H01M 2300/0068* (2013.01); *H02J 50/10* (2016.02)

(58) Field of Classification Search
CPC .. H01M 10/0562; H01M 10/058; H01M 6/40; H01M 2220/30; H01M 2300/0068; H01M 50/543; H02J 7/025; H02J 50/10; Y02E 60/10; Y02P 70/50; G02B 1/04; G02B 27/022
USPC .................................................. 351/159.02
See application file for complete search history.

(56) References Cited

U.S. PATENT DOCUMENTS

| | | | |
|---|---|---|---|
| 2013/0194540 A1* | 8/2013 | Pugh ...................... | G02C 7/083 623/6.11 |
| 2015/0030909 A1* | 1/2015 | Ihlefeld ............. | H01M 10/0562 429/162 |
| 2015/0201837 A1 | 7/2015 | Song et al. | |
| 2015/0378176 A1* | 12/2015 | Flitsch ................... | H01L 23/58 623/6.56 |
| 2016/0056417 A1 | 2/2016 | Flitsch et al. | |
| 2016/0091737 A1 | 3/2016 | Kim et al. | |
| 2016/0133917 A1* | 5/2016 | Choi ................. | H01M 10/0436 429/162 |
| 2016/0254500 A1* | 9/2016 | Kawata ................. | H01M 50/24 362/157 |

FOREIGN PATENT DOCUMENTS

| | | |
|---|---|---|
| KR | 1020160023614 A | 3/2016 |
| KR | 1020160037008 A | 4/2016 |
| KR | 101661174 B1 | 10/2016 |
| KR | 1020160141586 A | 12/2016 |
| WO | 2014186368 A1 | 11/2014 |

OTHER PUBLICATIONS

Korea Institute of Science and Technology Website <http://www.kist.re.kr/kist_web/?sub_num=46&state=view&ord=()&pageNo=8&idx=1445> with brief English translation, Jul. 10, 2016.

* cited by examiner

SMART WEARABLE LENS MOUNTED WITH ALL-SOLID-STATE THIN FILM SECONDARY BATTERY AND METHOD FOR MANUFACTURING THE SAME

CROSS-REFERENCE TO RELATED APPLICATION

This application claims the priority of Korean Patent Application No. 10-2017-0095660, filed on Jul. 27, 2017 and all the benefits accruing therefrom under 35 U.S.C. § 119, the contents of which in their entirety are herein incorporated by reference.

BACKGROUND

1. Field

The present disclosure relates to a smart wearable lens mounted with an all-solid-state thin film secondary battery as an ultrathin energy storage unit, and a method for manufacturing the same.

DESCRIPTION ABOUT NATIONAL SUPPORT RESEARCH AND DEVELOPMENT

This study is made by the support of Korea Ministry of Science, ICT and Future Planning under the supervision of Korea Institute of Science and Technology and the research subject title is "Development of Contact Lens Type Device For Diagnosis of Diabetes" (Subject Identification No.: 1711038180).

2. Description of the Related Art

So-called smart wearable devices, which are wearable devices including various microelectronic devices, are drawing much attention as for next commercial products that can be used along with smart phones or after the smart phones, so as that even the global IT companies such as Google, Samsung, and Apple are competitively developing the relevant products.

In particular, Google has drawn new attention through development of a smart contact lens in recent years, and Samsung has also developed a contact lens display mounted with micro-video cameras to realize augmented reality.

However, the smart contact lens currently under development is still conceptual and also lacks a power module or an energy storage technology for practical implementation and activation.

SUMMARY

In one aspect, the present disclosure is directed to providing a smart wearable lens mounted with an all-solid-state thin film secondary battery, which may be stably and continuously supplied with power and has a low self-discharge rate, and a method for manufacturing the same.

In another aspect, the present disclosure is also directed to providing a smart wearable lens mounted with an all-solid-state thin film secondary battery, which may minimize aversion even when the smart wearable lens comes into direct contact with the human body as in the case of a contact lens, and a method for manufacturing the same.

In further another aspect, the present disclosure is also directed to providing a smart wearable lens mounted with an all-solid-state thin film secondary battery that may be suitably applied to a curved lens, especially to a micro-lens such as a contact lens, and be formed to have various shapes and sizes, and a method for manufacturing the same.

In example embodiments of the present invention, there is provided a smart wearable lens, comprising a lens and an all-solid-state thin film secondary battery mounted on the lens, wherein the all-solid-state thin film secondary battery includes a flexible substrate, a cathode current collector, a cathode, a solid electrolyte, an anode, and an anode current collector.

In example embodiments of the present invention, there is also provided a method for manufacturing a smart wearable lens mounted with an all-solid-state thin film secondary battery, comprising preparing an all-solid-state thin film secondary battery by forming a cathode current collector, a cathode, a solid electrolyte, an anode, and an anode current collector on a flexible substrate, and attaching the prepared all-solid-state thin film secondary battery on a smart wearable lens.

BRIEF DESCRIPTION OF THE DRAWINGS

The above and other aspects, features and advantages of the disclosed example embodiments will be more apparent from the following detailed description taken in conjunction with the accompanying drawings in which.

DETAILED DESCRIPTION

Figure 1A:
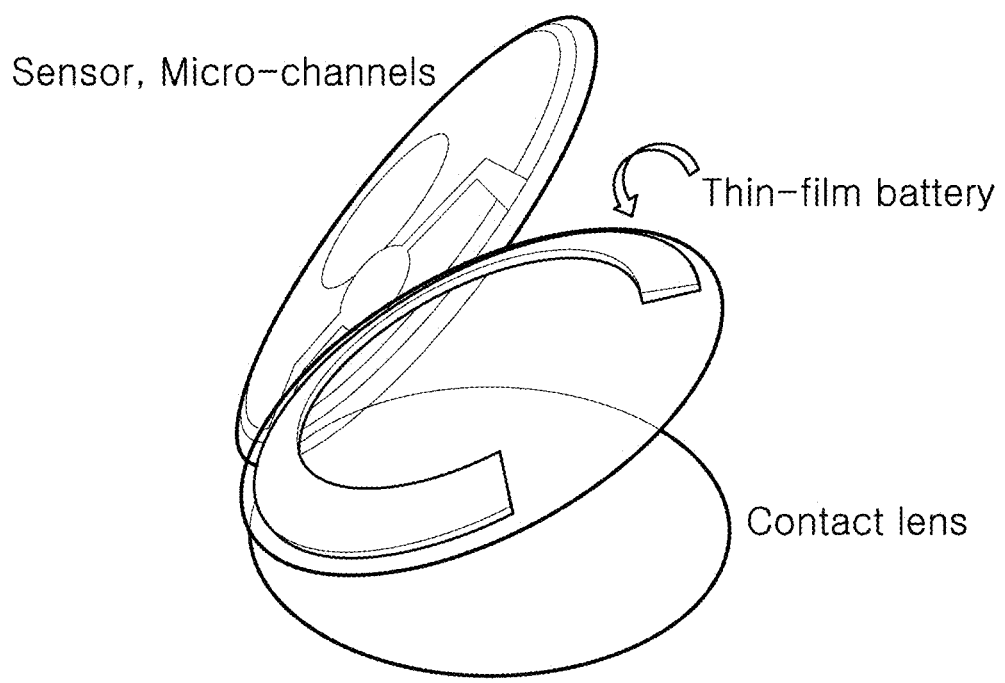
FIG. 1A is a schematic view illustrating an all-solid-state thin film secondary battery formed on a smart wearable lens in an example embodiment of the present invention.

Example embodiments are described more fully hereinafter. The invention may, however, be embodied in many different forms and should not be construed as limited to the example embodiments set forth herein. Rather, these example embodiments are provided so that this disclosure will be thorough and complete, and will fully convey the scope of the invention to those skilled in the art. In the description, details of features and techniques may be omitted to more clearly disclose example embodiments.

The terminology used herein is for the purpose of describing particular embodiments only and is not intended to be limiting of the invention. As used herein, the singular forms "a," "an" and "the" are intended to include the plural forms as well, unless the context clearly indicates otherwise. Furthermore, the use of the terms a, an, etc. do not denote a limitation of quantity, but rather denote the presence of at least one of the referenced item. The terms "first," "second," and the like do not imply any particular order, but are included to identify individual elements. Moreover, the use of the terms first, second, etc. do not denote any order or importance, but rather the terms first, second, etc. are used to distinguished one element from another.

Unless otherwise defined, all terms (including technical and scientific terms) used herein have the same meaning as commonly understood by one of ordinary skill in the art. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein. All methods described herein can be performed in a suitable order unless otherwise indicated herein or otherwise clearly contradicted by context. The use of any and all examples, or exemplary language (e.g., "such as"), is intended merely to better illustrate the invention and does not pose a limitation on the scope of the invention unless otherwise claimed. No language in the specification should be construed as indicating any non-claimed element as essential to the practice of the invention as used herein.

Definition of Terms

In the present disclosure, "smart wearable lens" refers to a smart wearable device including a lens such as glasses or contact lenses.

In the present disclosure, "thin film secondary battery" refers to a rechargeable battery, the components of which are thinly formed on a thin substrate. This thin film secondary battery has a very small thickness, for example of 0.10 mm or less, and includes a cathode current collector, a cathode, an electrolyte, an anode, and an anode current collector.

In the present disclosure, "all-solid-state thin film secondary battery" refers to a thin film secondary battery, all of the components of which are in a solid state and which includes a solid electrolyte.

DESCRIPTION OF EXAMPLE EMBODIMENTS

Hereinafter, example embodiments of the present disclosure will be described in detail with reference to the accompanying drawings.

In example embodiments, an all-solid-state thin film secondary battery is prepared using a flexible substrate which enables the crystallization of a cathode active material on a flat plane, and then a smart wearable lens mounted with the all-solid-state thin film secondary battery is manufactured by applying the all-solid-state thin film secondary battery onto a curved lens.

FIG. 1A is a schematic view illustrating an all-solid-state thin film secondary battery mounted on a smart wearable lens in an example embodiment of the present invention.

As illustrated in FIG. 1A, the all-solid-state thin film secondary battery may be a power source of a contact lens, which are mounted with sensors, micro-channels, etc., and may be formed on the curved surface of the lens to have a C-shape.

Figure 1B:
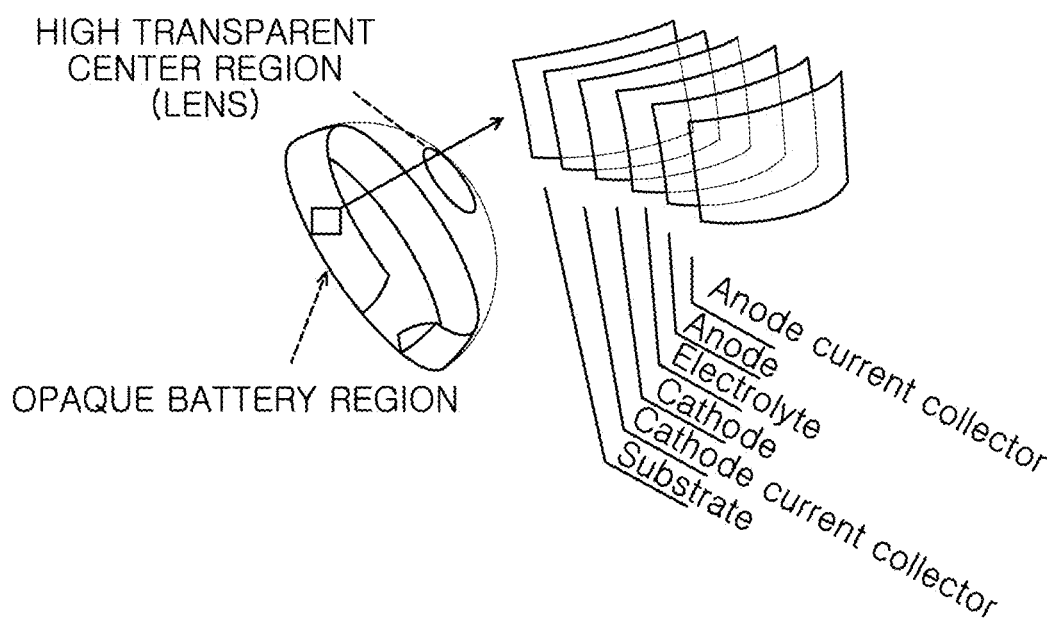
FIG. 1B is a schematic view illustrating a stacked structure of an all-solid-state thin film secondary battery in an example embodiment of the present invention.

FIG. 1B is a schematic view illustrating a stacked structure of an all-solid-state thin film secondary battery in an example embodiment of the present invention.

As illustrated in FIG. 1B, the all-solid-state thin film secondary battery may be a flexible thin film battery wherein a cathode active material, a solid electrolyte, and an anode active material are stacked on a flexible substrate.

In more particular, a cathode current collector, a cathode active material, a solid electrolyte, an anode active material, and an anode current collector may be formed on the flexible substrate.

This flexible all-solid-state thin film secondary battery is positioned on the lens along with at least some of the curved surface of the lens, and the flexible substrate contacts with the lens.

Referring to FIG. 1B, the center portion of the lens, which corresponds to a pupil region, is kept transparent for visibility, and the opaque all-solid-state thin film secondary battery is formed on the edged or lateral region of the lens along with curved surface of the hemispherical lens, which is a region except for the pupil region. For example, the all-solid-state thin film secondary battery may be formed along the lateral curved edge of the hemispherical lens in a C-shape, namely in a form in which an outer arc is long in length and an inner arc is short in length.

The all-solid-state thin film secondary battery may be formed on the lens in various shapes and sizes in addition to the C-shape. In another non-limiting example, the above stacked structure having the battery components may be prepared in a plural number on a plurality of substrates, and then the plurality of the stacked structures may be connected in parallel or in series on a lens.

Figure 2:
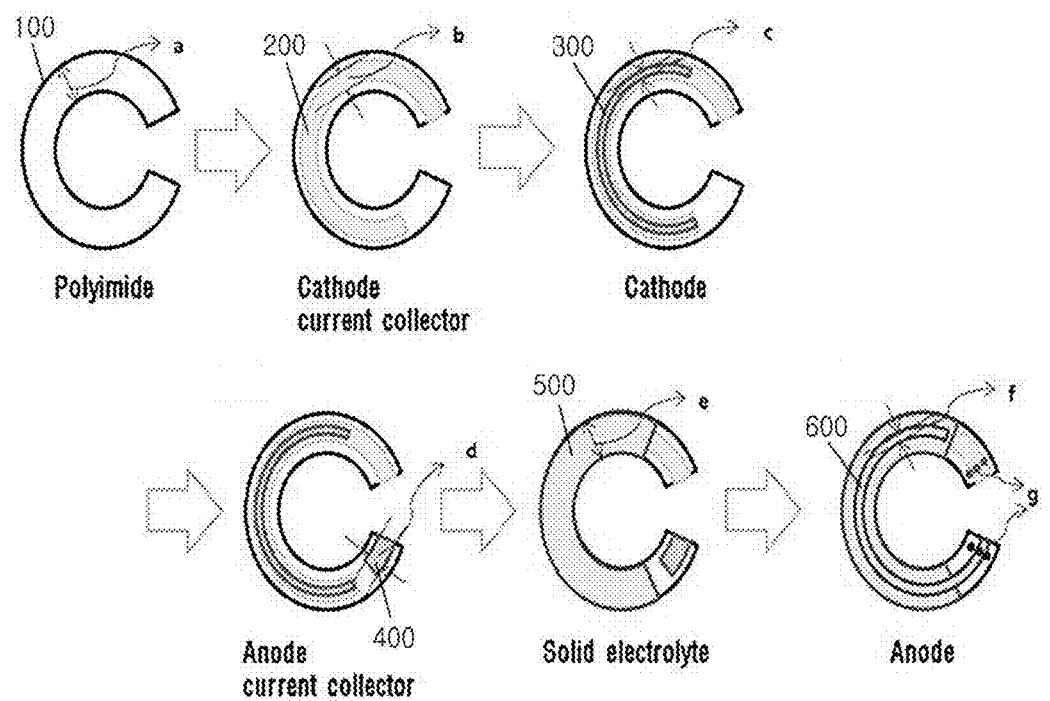
FIG. 2 is a schematic view illustrating a thin film forming sequence and size of an all-solid-state thin film secondary battery formed on a smart wearable lens in an example embodiment of the present invention.

FIG. 2 is a schematic view illustrating a thin film forming sequence and size of an all-solid-state thin film secondary battery formed on a smart wearable lens in an example embodiment of the present invention.

As illustrated in FIG. 2, the all-solid-state thin film secondary battery is separately prepared before it is attached onto the lens in the example embodiment of the present invention. That is, the all-solid-state thin film secondary battery is not prepared immediately on the curved lens, but it is separately prepared on the flat plane and then attached onto the lens.

In an example embodiment, the process of preparing the all-solid-state thin film secondary battery is as follows.

First, a flexible substrate 100 is prepared (see FIG. 2). This substrate is easy to attach to a lens having hemispherical curved structure since it is flexible.

In an example embodiment, a flexible substrate which enables a crystallization of a cathode active material may be used. For example, a polyimide substrate, a PET substrate, a PEN substrate, or an exfoliated mica substrate may be used as for such substrate.

As described above, the substrate may be prepared, for example, in a C-shape in which an outer-diameter arc (i.e., an arc having an outer diameter) is comparatively long in length and an inner-diameter arc (i.e., an arc having an inner diameter) is comparatively short in length, in order to attach the substrate to the lens having a curved surface such as that of a sphere. As such, the substrate may be attached to various curved surfaces by altering the lengths of the inner- and outer-diameter arcs of the battery.

In a non-limiting example, the all-solid-state thin film secondary battery may be formed in a C-shape on a region of the contact lens except for the pupil part for visibility when humans are wearing the contact lens, for example, on a region except for the portion of the contact lens, the inner diameter of which is 6 mm or less. In addition, the all-solid-state thin film secondary battery may have an outer diameter less than or equal to 14 mm that is the outer diameter of the typical used contact lens.

In a non-limiting example, the substrate 100 may have a width (a) of maximum of 4.5 mm or less.

Next, a cathode current collector 200 is formed on the substrate 100 (see FIG. 2). The cathode current collector may be a thin film made of, for example, one or more selected from Pt, Al, Cu, Ni, Ni—Cr, and the like.

In a non-limiting example, the cathode current collector may have, for example, a thickness of 200 nm or less and a width (b) less than or equal to the width (a) of the substrate. In a non-limiting example, the cathode current collector may have a width (b) of 0.5 mm≤b≤4.5 mm. Meanwhile, the lengths (the lengths of the inner- and outer-diameter arcs) of the cathode current collector are formed shorter than the lengths (the lengths of the inner- and outer-diameter arcs) of the substrate. Accordingly, an anode current collector may be formed later on a portion of the substrate in which the cathode current collector is not formed.

Next, a cathode 300 is formed on the cathode current collector 200 (see FIG. 2). In an example embodiment, a cathode active material for secondary batteries may be used for the cathode, and one or more selected from $LiCoO_2$, $LiMnO_2$, $LiNiO_2$, $LiNi_xMn_yCo_{1-x-y}O_2$, $LiFePO_4$, $LiMnPO_4$, $LiNiPO_4$, $LiFe_{1-x}Mn_xPO_4$, $LiMn_2O_4$, and the like may be used for the cathode active material.

The cathode may have a width (c) less than or equal to the width (b) of the cathode current collector. In a non-limiting example, the cathode may have a width (c) of 0.5 mm≤c≤4.5 mm. Since the area of the cathode especially affects performance, the performance may be adjusted according to the area of the cathode. The cathode has at least a width of 0.5 mm or more in terms of minimum battery performance, and thus the widths of other battery components may be set accordingly. The thickness of the cathode may vary depending on the capacity of the battery etc.

Next, an anode current collector 400 is formed on a portion of the substrate in which the cathode current collector is not formed (see FIG. 2). The cathode current collector is formed so as not to contact with the anode current collector since a short circuit may occur when they contact with each other. The anode current collector may also be a thin film made of, for example, one or more selected from Pt, Al, Cu, Ni, Ni—Cr, and the like.

In a non-limiting example, the anode current collector may also have, for example, a thickness of 200 nm or less and a width (d) less than or equal to the width (a) of the substrate. In a non-limiting example, the anode current collector may have a width (d) of 0.5 mm≤d≤4.5 mm.

Next, a solid electrolyte 500 is formed on the cathode to cover the cathode and expose some of the cathode current collector (see FIG. 2). In a non-limiting example, a solid electrolyte for secondary batteries may be used, and one or more selected from LiPON, LiBON, $LiLaTiO_3$, and the like may be used for the solid electrolyte.

In a non-limiting example, the solid electrolyte may have, for example, a thickness of 300 nm. The solid electrolyte may have a width (e) less than or equal to the width (a) of the substrate. In a non-limiting example, the solid electrolyte may have a width (e) of 0.5 mm≤e≤4.5 mm.

Next, an anode 600 is formed on the solid electrolyte to lead to the anode current collector which is not covered by the solid electrolyte. In an example embodiment, an anode active material for secondary batteries may be used, and one or more selected from Li, Si, Si—Al, $SiN_x$, $Li_4Ti_5O_{12}$, graphite, carbon nanotube, graphene, and the like may be used for the anode active material.

The anode may also have a width (f) less than or equal to the width (a) of the substrate. In a non-limiting example, the anode may have a width (f) of 0.5 mm≤f≤4.5 mm. The thickness of the anode may also vary depending on the capacity of the battery or the like, similar to the thickness of the cathode.

Meanwhile, charging terminals (g) may be formed at the ends of the cathode current collector and anode current collector, and the wired charging is possible through the charging terminals (g).

In the above method, the thin film formation of the cathode current collector, the cathode active material, the solid electrolyte, the anode active material, and the anode current collector may be made through deposition such as sputtering, or they may also be deposited using other thin film deposition equipment such as a PLD, an ALD, an evaporator, an E-beam, a spin-coater, a spray-deposition, a CVD, a PECVD, etc.

The above all-solid-state thin film secondary battery may be prepared in various shapes and sizes. However, in an example embodiment, the all-solid-state thin film secondary battery may have a width (i.e., "a" in FIG. 2) of maximum of 4.5 mm and an area of up to 1.05 $cm^2$. In addition, the battery excluding the substrate may have a thickness of maximum of 100 μm or less.

This prepared all-solid-state thin film secondary battery is attached on the lens along with the curved surface of the lens such that the substrate contacts with the lens (see FIGS. 1A and 1B). In this case, the all-solid-state thin film secondary battery may be attached with an adhesive, for example epoxy etc., which are harmless to the human body and may not damage the lens.

In an example embodiment, the all-solid-state thin film secondary battery may be packaged by coating the uppermost layer thereof with parylene or the like that is harmless to the human body.

Meanwhile, in an example embodiment, the all-solid-state thin film secondary battery may be charged in a wired or wireless manner. For example, as described above, the all-solid-state thin film secondary battery is able to be charged in a wired manner through the charging terminals indicated as "g" of FIG. 2.

Figure 3:
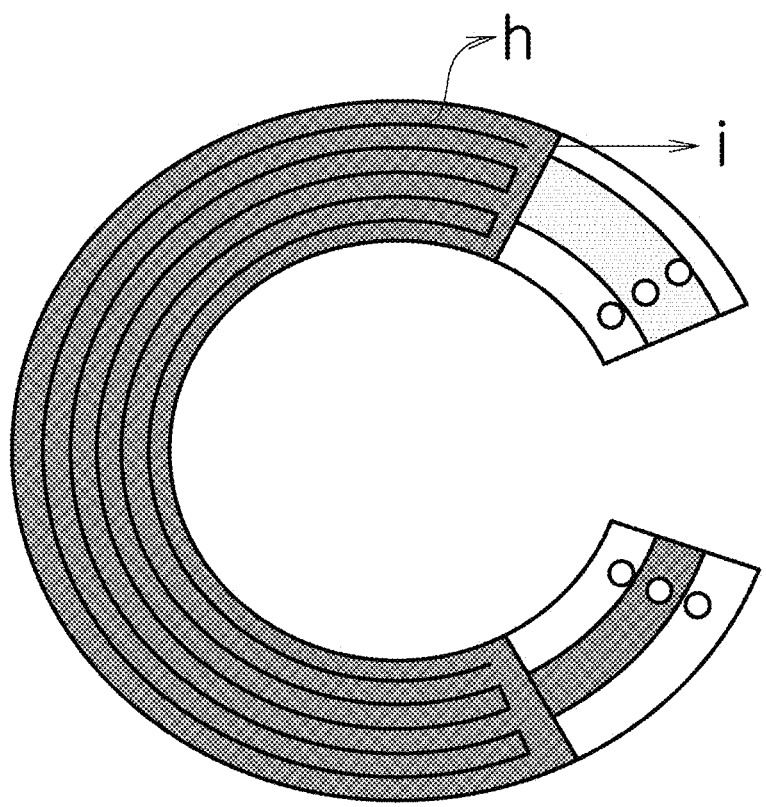
FIG. 3 is a schematic view illustrating a wireless charging coil by magnetic induction of an all-solid-state thin film secondary battery in an example embodiment of the present invention.

Further, FIG. 3 is a schematic view illustrating a wireless charging coil by magnetic induction of an all-solid-state thin film secondary battery in an example embodiment of the present invention. As illustrated in FIG. 3, the all-solid-state thin film secondary battery may be charged in a wireless manner by magnetic induction through a coil (h) formed on the uppermost coating layer, for example, the parylene coating layer (i).

Hereinafter, the present disclosure will be described in detail through examples. However, the following examples are for illustrative purposes only and it will be apparent to those of ordinary skill in the art that the scope of the present disclosure is not limited by the examples.

EXAMPLE

In order to attach an all-solid-state thin film secondary battery to a hemispherical lens, the lengths of arcs are individually calculated from the uppermost portion of the region except for the pupil of the lens to the end of the lens. To this end, the all-solid-state thin film secondary battery comes to have a C-shaped design.

Accordingly, a polyimide flexible substrate having a C-shaped plane is prepared. The C-shaped substrate is formed to have a C-shape in which an outer arc is long in length and an inner arc is short in length so as that it can be attached to the curved surface of the lens. The width of the substrate is set to be 4 mm.

For cleaning the substrate before film formation, the substrate is washed with acetone for 15 minutes, methanol for 15 minutes, and D.I. water for 15 minutes in an ultrasonic washing machine, and then dried with $N_2$ gas. As for a cathode current collector thin film, platinum is used and deposited on the substrate by a DC sputter.

The thickness and width of the cathode current collector are set to be about 80 nm and 3 mm, respectively.

To form a cathode thin film on the cathode current collector, a single-phase target composed of $LiFePO_4$ is formed on the polyimide substrate, having platinum deposited thereon, using an RF magnetron sputtering (Samwon Vacuum, Korea).

The thickness and width of the cathode thin film are set to be 1 μm and 3 mm, respectively.

The cathode thin film is formed on the platinum-deposited substrate, in which the thin film is manufactured under an initial degree of vacuum of $5\times10^{-6}$ mTorr before film formation and under a pressure of 40 mTorr during film formation. The power at the time of film formation is set to be 160 W (4" target, 2 W/cm$^2$), which is an optimal condition obtained through preliminary experiments.

Meanwhile, after the thin film is prepared as the temperature of the platinum-deposited substrate is fixed as room temperature, and heat treatment is performed to crystallize the cathode thin film in a reducing atmosphere while 3% of $H_2/(Ar+H_2)$ is injected therein at a speed of 800 cc per minute in a furnace, the atmosphere of which is adjustable. Herein, the heat treatment is performed at a temperature of 400° C. and a heating rate of 3° C./min for 2 hours, and the crystallization is made after the heat treatment in the atmosphere furnace.

Since the polyimide substrate has high heat resistance, such heat treatment for cathode crystallization is possible.

Next, $Li_3PO_4$ target is used for a solid electrolyte. LiPON thin film is formed using an RF magnetron sputtering at room temperature through reactive sputtering.

The thickness and width of the solid electrolyte thin film are set to be about 1 μm and 4 mm, respectively.

An anode is deposited with a Li metal or $SiN_x$ at room temperature using a heat evaporator or a sputter.

The thickness and width of the anode thin film are set to be 200 to 300 nm and 3 mm, respectively.

A copper thin film is deposited as for an anode current collector at room temperature using a DC sputter. The anode current collector is formed on a substrate portion in which the cathode current collector is not formed.

The thickness and width of the anode current collector are set to be about 80 nm and 3 mm, respectively.

The prepared all-solid-state thin film secondary battery is attached with epoxy that is harmless to the human body and does not damage the lens. In addition, the all-solid-state thin film secondary battery is packaged by coating the uppermost layer thereof with parylene that is harmless to the human body as well.

Figure 4A:
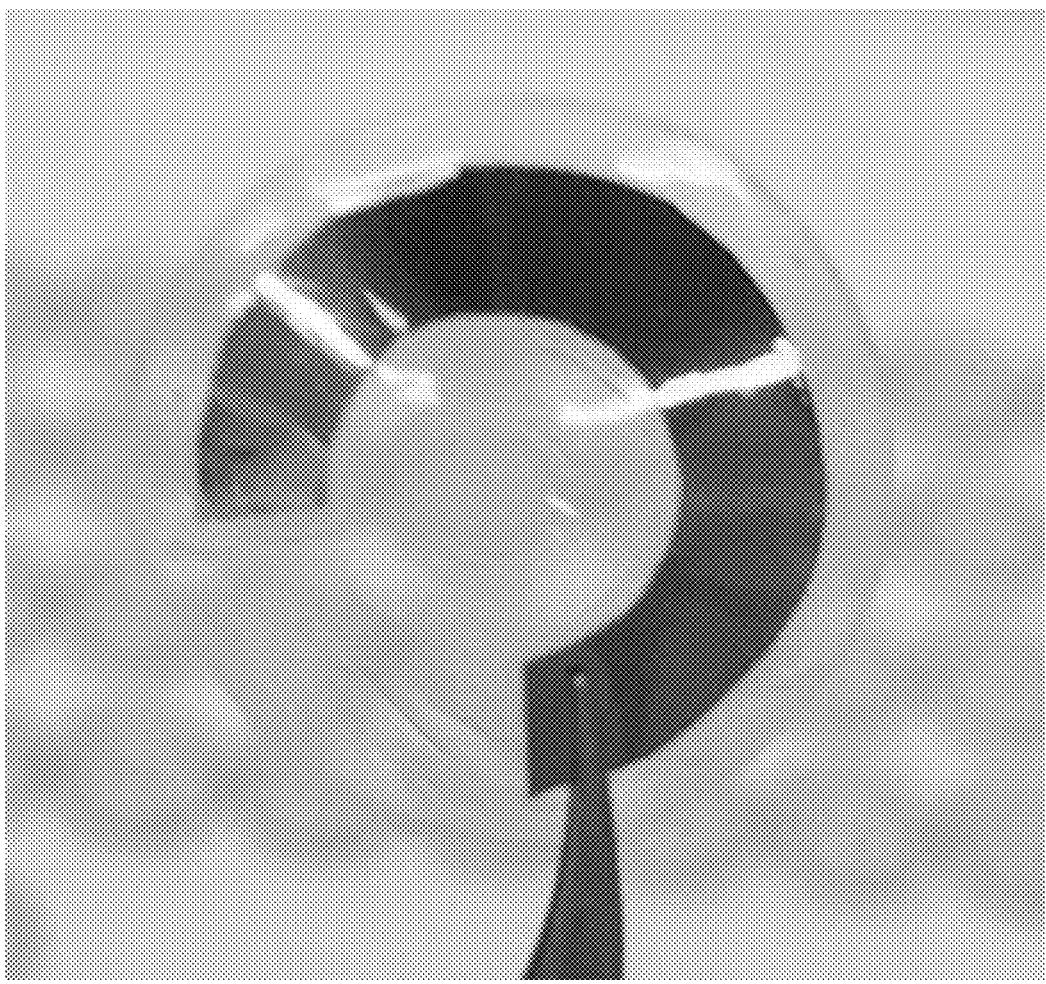
FIGS. 4A to 4C are photographs illustrating an all-solid-state thin film secondary battery attached to a lens in an example of the present invention.
Figure 4B:
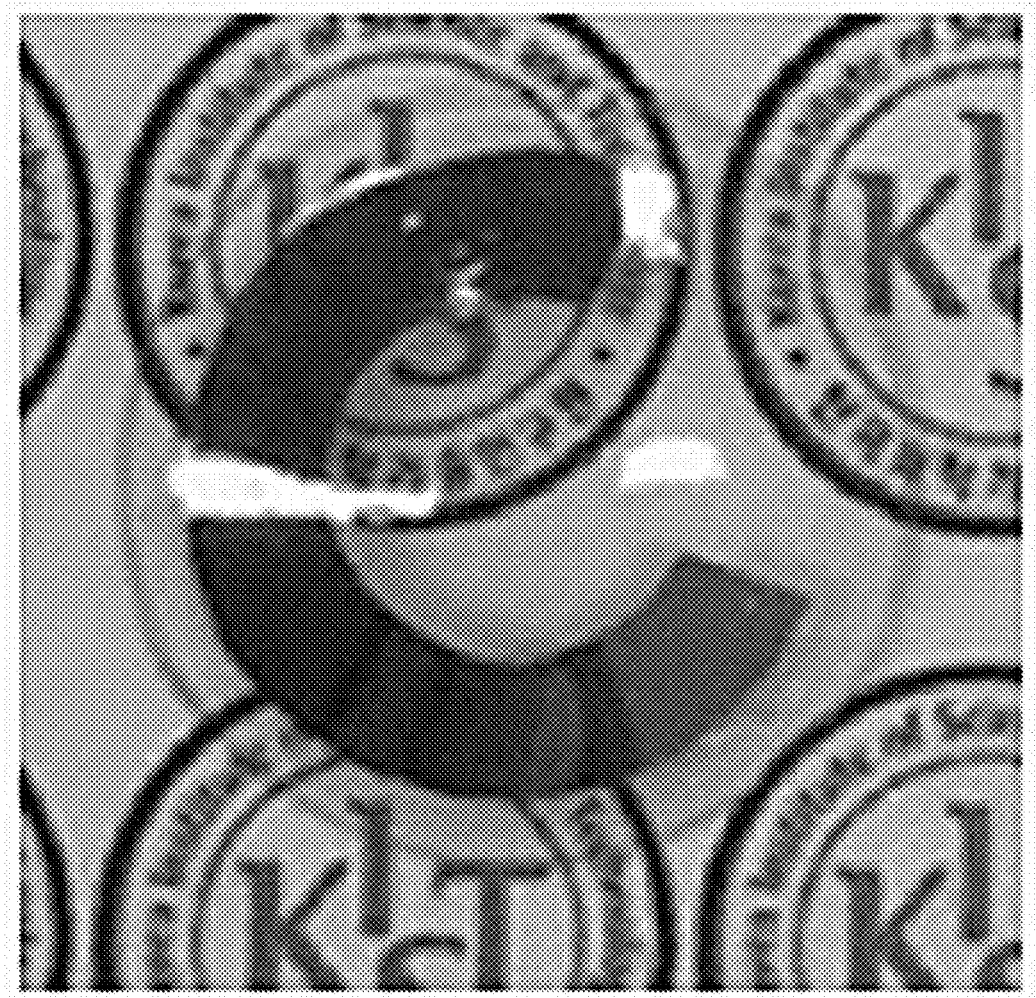
Figure 4C:
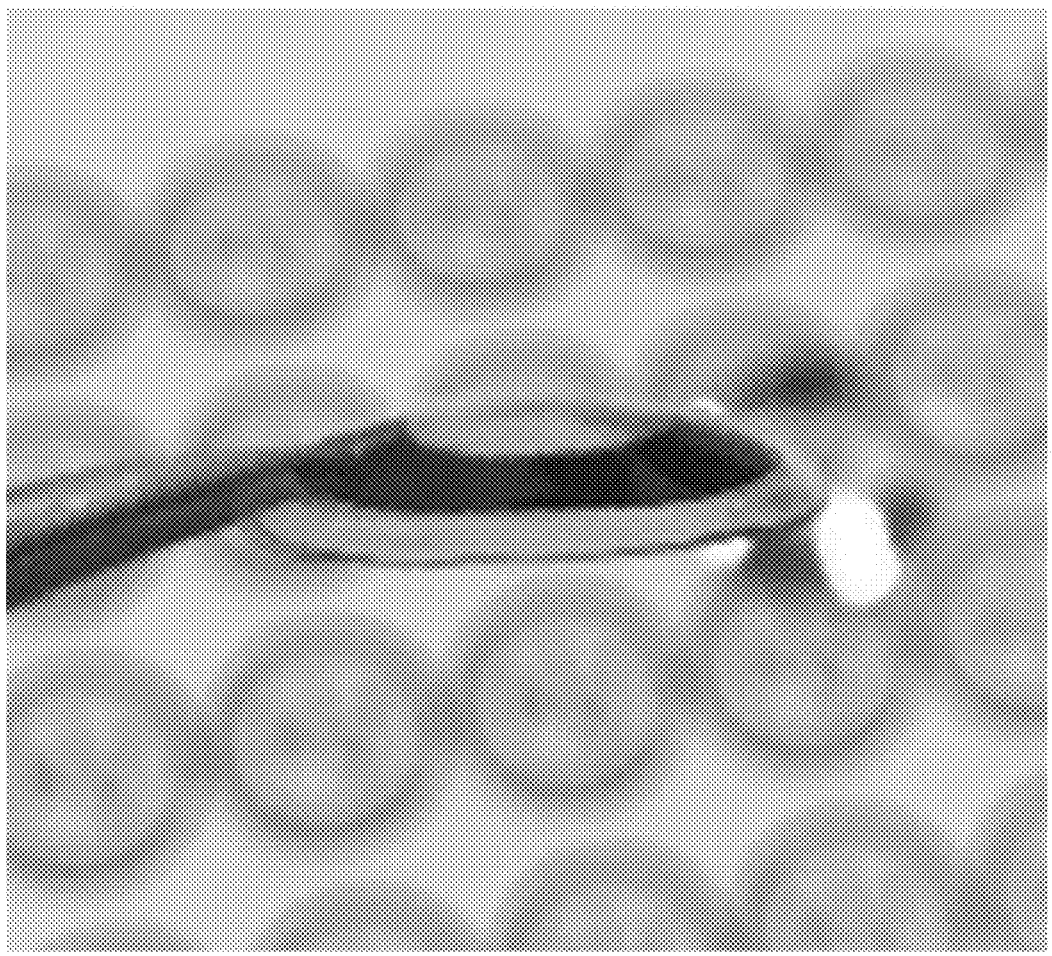

FIGS. 4A to 4C are photographs illustrating an all-solid-state thin film secondary battery attached onto a lens in an example of the present invention.

In particular, FIG. 4A is illustrating the all-solid-state thin film secondary battery attached onto a lens, FIG. 4B is illustrating a top view thereof, and FIG. 4C is illustrating a top view thereof.

Figure 5:
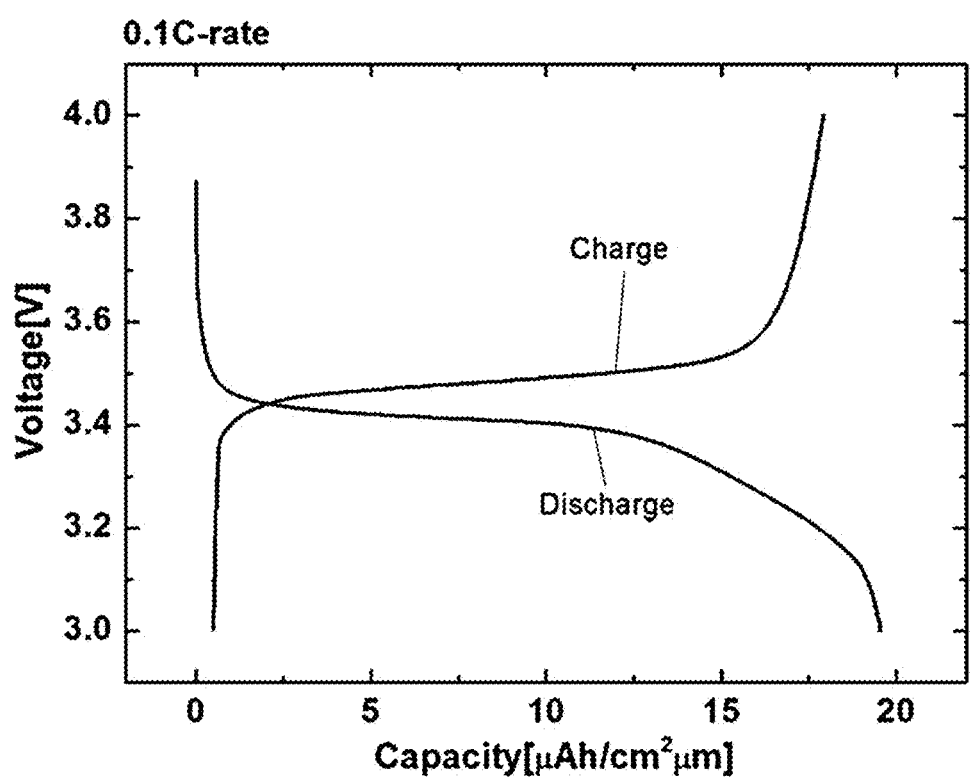
FIG. 5 is a graph illustrating charge and discharge capacity value of an all-solid-state thin film secondary battery in an example of the present invention.

FIG. 5 is a graph illustrating charge and discharge capacity value of an all-solid-state thin film secondary battery in an example of the present invention.

Figure 6:
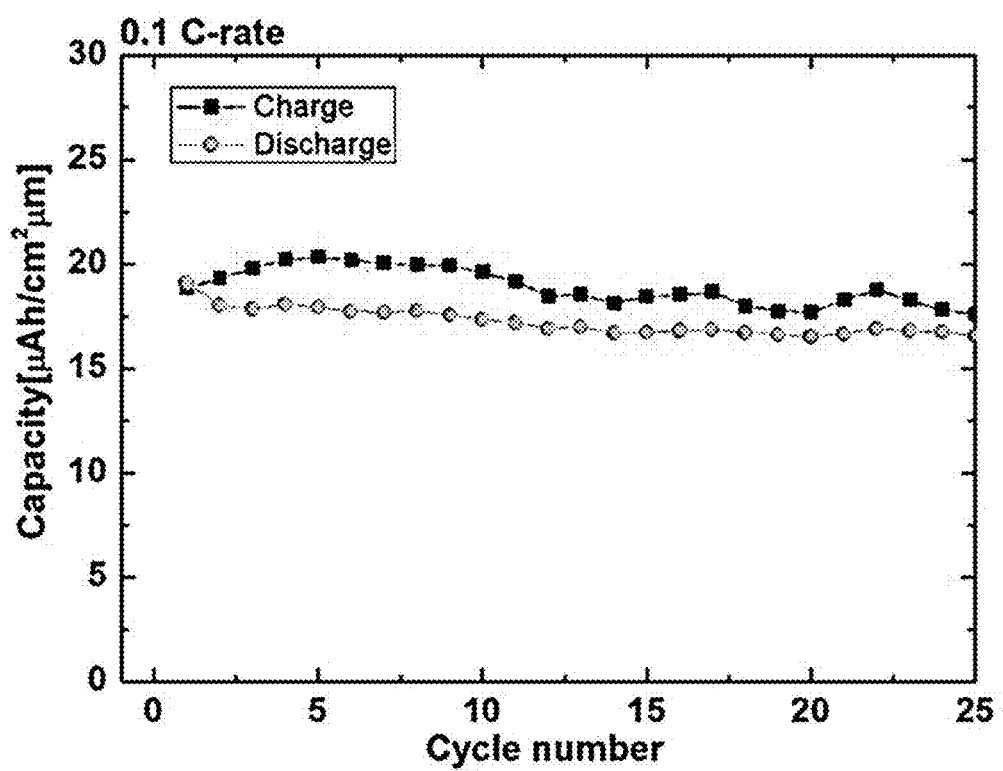
FIG. 6 is a graph illustrating cycle capacity of an all-solid-state thin film secondary battery in an example of the present invention.

FIG. 6 is a graph illustrating cycle capacity of an all-solid-state thin film secondary battery in an example of the present invention.

As a result of measuring the charge and discharge of the all-solid-state thin film secondary battery in the example of the present invention, an initial discharge capacity of 66.44 μWh/cm$^2$ μm are able to be obtained as illustrated in FIG. 5.

Accordingly, in example embodiments of the present invention, the electric energy of the all-solid-state thin film secondary battery formable on the lens may be about 332.2 μWh when the battery has an area of maximum of 1.05 cm$^2$, the battery excluding the substrate has a thickness of maximum of 100 μm or less, and the cathode active material has a thickness of 5 μm.

In addition, when the cathode active material is implemented at the level of 60% compared to the theoretical capacity, the electric energy of 650 μWh may be obtained. For example, since the electric energy required for a diabetes diagnosis smart lens is about 200 μWh, it has the power applicable to the diabetes diagnosis smart lens.

Meanwhile, after measuring the cycle safety of the all-solid-state thin film secondary battery, a very stable result is obtained where there is hardly a change in capacity even though the battery is charged and discharged by 25 cycles as shown in FIG. 6.

According to the example embodiments of the present invention, it is possible to resolve a difficulty of stable and continuous power supply in a smart contact lens etc., which is caused by a lack of suitable power module of the existing smart lens etc. In particular, since the smart wearable lens according to the example embodiments can be stably and continuously supplied with power for a long time as well as a higher voltage compared to a super capacitor and has a very low self-discharge rate, the smart wearable lens according to the example embodiments is expected to have high availability.

According to the example embodiments of the present invention, it is possible to provide human body with a smart wearable lens having a power technology that may minimize aversion of the human body to the smart wearable lens.

According to the example embodiments of the present invention, the all-solid-state thin film secondary battery can be formed in various shapes and sizes and be suitably used for a curved lens, especially a micro-lens such as a contact lens.

While the present invention has been described with respect to the example embodiments, it will be apparent to those skilled in the art that various changes and modifications may be made without departing from the spirit and scope of the invention as defined in the following claims.

What is claimed is:

1. A smart wearable lens, comprising a lens; and an all-solid-state thin film secondary battery mounted on the lens, wherein the all-solid-state thin film secondary battery comprises a flexible substrate, a cathode current collector, a cathode, a solid electrolyte, an anode, and an anode current collector, wherein the all-solid-state thin film secondary battery further comprises a wireless charging coil connected to the anode current collector and cathode current collector, wherein the wireless charging coil is disposed on an uppermost layer of the all-solid-state thin film secondary battery, wherein the solid electrolyte has a thickness of maximum of 300 nm or less and a width of 4.5 mm or less, the cathode current collector has a thickness of 200 nm or less and a width less than the width of the solid electrolyte, and the anode current collector has a thickness of 200 nm or less and a width less than the width of the solid electrolyte.

2. The smart wearable lens according to claim 1, wherein:
the all-solid-state thin film secondary battery is positioned on the lens along with at least some of a curved region of the lens; and
the flexible substrate contacts with the lens.

3. The smart wearable lens according to claim 2, wherein the all-solid-state thin film secondary battery has a constant width, and
the all-solid-state thin film secondary battery has inner and outer arcs so that the all-solid-state thin film secondary battery has a shape in which the inner arc has a shorter length than the outer arc.

4. The smart wearable lens according to claim 3, wherein the cathode current collector is deposited on a portion of the flexible substrate which has a constant width and has inner and outer arcs so as to have a C-shape in which the inner arc has a shorter length than the outer arc;
the cathode is deposited on the cathode current collector;
the anode current collector is deposited on a portion of the flexible substrate in which the cathode current collector is not formed;
the solid electrolyte is deposited on the cathode; and
the anode is deposited on the solid electrolyte such that the anode is connected to the anode current collector, which is not covered by the solid electrolyte.

5. The smart wearable lens according to claim 2, wherein the lens is a contact lens, and
the all-solid-state thin film secondary battery is positioned on a region except for a pupil region of the contact lens.

6. The smart wearable lens according to claim 5, wherein the all-solid-state thin film secondary battery has a C-shape and is positioned along with edged and curved region of the contact lens.

7. The smart wearable lens according to claim 6, wherein the all-solid-state thin film secondary battery has a width of 4.5 mm or less, and
the all-solid-state thin film secondary battery excluding the substrate has a thickness of maximum of 100 μm or less.

8. The smart wearable lens according to claim 5, wherein:
the all-solid-state thin film secondary battery consists of a plurality of all-solid-state thin film secondary batteries formed on flexible substrates having different shapes and sizes; and
the plurality of all-solid-state thin film secondary batteries are positioned in series or in parallel on a region except for the pupil region of the contact lens.

9. The smart wearable lens according to claim 1, wherein the flexible substrate is a polyimide substrate, a polyethylene terephthalate (PET) substrate, a polyethylene naphthalate (PEN) substrate, or an exfoliated mica substrate.

10. The smart wearable lens according to claim 1, wherein the all-solid-state thin film secondary battery is packaged.

11. A method for manufacturing a smart wearable lens mounted with an all-solid-state thin film secondary battery, comprising:
preparing an all-solid-state thin film secondary battery by forming a cathode current collector, a cathode, a solid electrolyte, an anode, and an anode current collector on a flexible substrate; and
attaching the prepared all-solid-state thin film secondary battery on a smart wearable lens,
wherein the all-solid-state thin film secondary battery further comprises a wireless charging coil connected to the anode current collector and cathode current collector, wherein the wireless charging coil is disposed on an uppermost layer of the all-solid-state thin film secondary battery,
wherein the solid electrolyte that has a thickness of maximum of 300 nm or less and a width of 4.5 mm or less, the cathode current collector has a thickness of 200 nm or less and a width less than the width of the solid electrolyte, and the anode current collector has a thickness of 200 nm or less and a width less than the width of the solid electrolyte.

12. The method according to claim 11, wherein:
the smart wearable lens is a contact lens;
the all-solid-state thin film secondary battery is attached onto the contact lens so as to be positioned along with at least some of edged and curved region of the contact lens, except for a pupil region of the contact lens,
and the flexible substrate contacts with the contact lens.

13. The method according to claim 12, wherein the preparing of an all-solid-state thin film secondary battery comprises:
depositing the cathode current collector on a portion of the flexible substrate, wherein the flexible substrate has a constant width and has inner and outer arcs so as to have a C-shape in which the inner arc has a shorter length than the outer arc;
depositing the cathode on the cathode current collector;
depositing the anode current collector on a portion of the flexible substrate in which the cathode current collector is not formed;
depositing the solid electrolyte on the cathode; and
depositing the anode on the solid electrolyte such that the anode is connected to the anode current collector, which is not covered by the solid electrolyte.

14. The method according to claim 13, wherein:
the cathode is deposited and then crystallized; and
the flexible substrate is a polyimide substrate, a polyethylene terephthalate (PET) substrate, a polyethylene naphthalate (PEN) substrate, or an exfoliated mica substrate.

15. The method according to claim 13, further comprising packaging the all-solid-state thin film secondary battery with a packaging material.

\* \* \* \* \*